United States Patent Office 3,764,396
Patented Oct. 9, 1973

3,764,396

TRANSISTORS AND PRODUCTION THEREOF

Yasuo Tarui, Tokyo, Toshihiro Sekigawa, Yokohama, and Yutaka Hayashi, Tokyo, Japan, assignors to Kogyo Gijutsuin (also known as Agency of Industrial Science and Technology, Ministry of International Trade and Industry, Japanese Government), Tokyo, Japan Filed Apr. 16, 1970, Ser. No. 29,006
Claims priority, application Japan, Sept. 18, 1969, 44/73,847, 44/73,848
Int. Cl. B01j *17/00;* H01l *7/54, 11/14*
U.S. Cl. 148—1.5 4 Claims

ABSTRACT OF THE DISCLOSURE

A planar semiconductive structure is produced by introducing a first impurity into the semiconductor substrate by ion implantation to form a first semiconductor region, a second impurity whose conductivity type is opposite to that of the first impurity is introduced into the first semiconductor region by ion implantation or impurity diffusion to form a second semiconductor region whose conductivity type is opposite to that of the first semiconductor region, and a subsequent heat treatment is applied in such a manner that a defined portion of the first semiconductor region is exposed at the surface of said semiconductor substrate and the volume of the second semiconductor region is disposed wholly within the volume of the first semiconductor region.

BACKGROUND OF THE INVENTION

This invention relates generally to semiconductor devices and more particularly to a new process for producing field-effect transistors (hereinafter referred to as FET) and lateral transistors having super-high frequency characteristics.

Certain difficulties as will be fully described hereinafter have been encountered in the conventional techniques for the production of metal-insulator-semiconductor type field-effect transistors (hereinafter referred to as MIS.FET), and metal-oxide-semiconductor type field-effect transistors (hereinafter referred to as MOS.FET) and lateral transistors.

The term "lateral transistor" is herein used to designate a transistor in which the principal flow of current is parallel to the principal surface of the substrate.

SUMMARY OF THE INVENTION

It is an object of the present invention to provide a method of producing semiconductor structures and able to overcome the hereinafter mentioned difficulties encountered in the conventional techniques.

More specifically, an object of the invention is to provide a process for producting a FET of the type wherein the length of a region in which a channel is formed is determined by a difference between diffusion lengths of impurity diffusion, by which process the base resistance and base-to drain capacitance can be made low even when the channel length is made short.

Another object of the invention is to provide MIS.FET's and MOS.FET's for super-high frequency use which can be produced by a small number of process steps, and whose base resistances and base-to-drain capacitances are low.

Still another object of the invention is to provide lateral transistors in which the difficulties hitherto accompanying known lateral transistors are remarkably reduced or overcome, and which have excellent super-high frequency characteristics.

A further object of the invention is to provide a lateral transistor of high accuracy, in the production of which the base width is controlled by utilizing a difference between the diffusion lengths of impurities.

An additional object of the invention is to provide a process for producing lateral transistors in which the so-called "Early effect" is reduced, the accompanying "punch through" being thereby prevented, and the base width, base resistance, and base-to-collector capacitance are reduced.

The foregoing objects have been achieved by the present invention according to which, briefly summarized, there is provided a process for producting a FET wherein the base region at the surface portion of which a channel is to be formed is formed by introducing an impurity into the semiconductor by ion implantation and a subsequent heat diffusion process utilizing a difference between diffusion lengths of impurities.

According to the invention in another aspect thereof, there is provided a process for producing lateral transistors in which a main operational base region of the transistor base region is formed by introducing an impurity into the semiconductor and by a subsequent heat diffusion process utilizing a difference between diffusion lengths of impurities.

The nature, principles, and utility of the invention will be more clearly apparent from the following detailed description, wherein reference is made to the accompanying drawings, in which like parts are designated by like reference numerals.

DETAILED DESCRIPTION

As conducive to a full understanding of the present invention, the essential features and difficulties accompanying known processes for producing FET and lateral transistors will be considered in detail.

Figure 1:
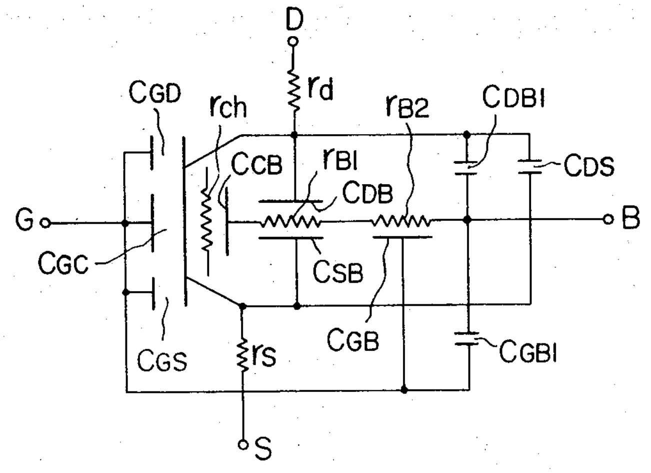
FIG. 1 is an equivalent circuit diagram of a parasitic element of a MIS.FET.

The organization and performance of a FET, particularly a MIS.FET may be described with reference to an equivalent circuit as illustrated in the diagram of FIG. 1. This circuit is provided with a gate terminal G, a drain terminal D, a source terminal S, and a base terminal B. A semiconductor region in which a channel is formed is herein referred to by the general term "base region."

The channel resistance is represented by resistor $r_{ch}$, the base resistances by resistors $r_{B1}$ and $r_{B2}$, the source resistance by resistor $r_s$, and the drain resistance by resistor $r_d$. Capacitors $C_{GC}$, $C_{GD}$, and $C_{GS}$ respectively represent capacitances between gate and channel, between gate and drain, and between gate and source, and capacitors $C_{CB}$, $S_{DB}$, $C_{SB}$, and $C_{GB}$ respectively represent capacitances between base and channel, between base and drain, between base and source, and between base and gate. Furthermore, capacitor $C_{DS}$ represents the capacitance between drain and source, and capacitors $C_{DB1}$ and $C_{GB1}$ respectively represent the capacitances between the base electrode and the drain and between the gate electrode and the base.

The effects of capacitances $C_{DB}$ and $C_{CB}$ in a case when this MIS.FET is used in a ground-source mode state will be considered. According to FIG. 1, a negative feedback circuit is formed from the drain to the channel by capacitances $C_{DB}$ and $C_{CB}$, whereby the gain at high frequencies decreases. For this reason, the ordinary expedient in this grounded-source case is to ground the base terminal B in an alternating-current manner to cause capacitances $C_{DB}$ and $C_{CB}$ to be grounded in an A-C manner and thereby to prevent the formation of a feedback path.

However, since capacitances $C_{DB}$ and $C_{CB}$ in this case are grounded through resistances $r_{B1}$ and $r_{B2}$, a negative feedback path will still be formed at frequencies above a cut-off frequency determined by at least capacitances $C_{DB}$ and $C_{CB}$ and resistances $r_{B1}$ and $r_{B2}$ and will give rise to a lowering of the gain in this frequency band. Since this decrease in gain arises within the element, it is not possible to eliminate this diadvantageous feature by a circuit technique such as neutralization. Accordingly, it is necessary that the resistances $r_{B1}$ and $r_{B2}$ and the capacitances $C_{DB}$ and $C_{CB}$ be made as low as possible.

Figure 2:
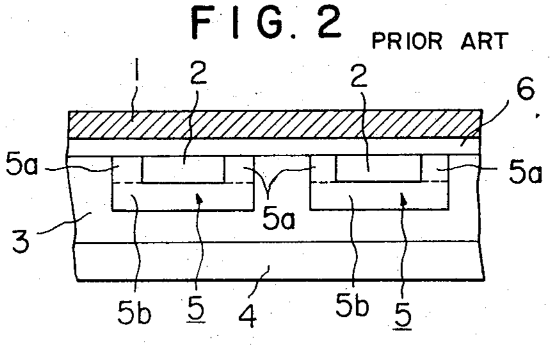
FIG. 2 PRIOR ART
FIG. 2 is an enlarged, fragmentary section of one example of a MIS.FET according to the prior art.
Figure 3A:
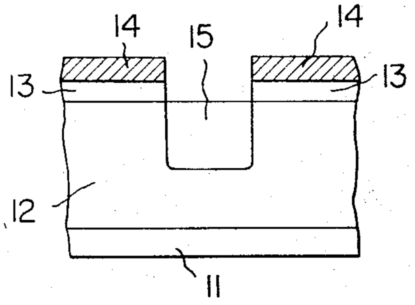
FIGS. 3(*a*), 3(*b*), 3(*c*), and 3(*d*) are similar sections respectively indicating successive steps in one example of practice of the process according to the invention for producing a FET.
Figure 3B:
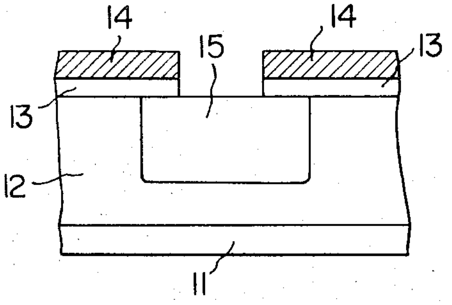
Figure 3C:
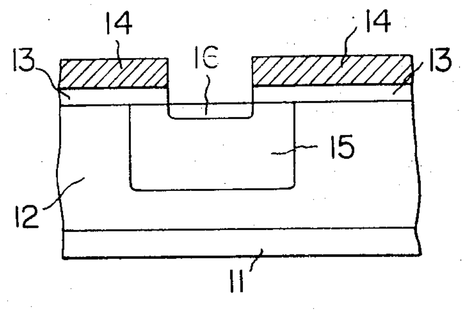
Figure 3D:
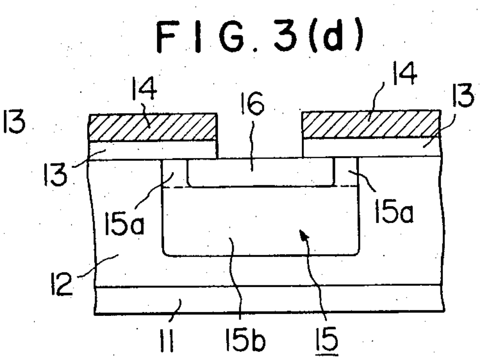

An example of a MIS.FET capable of obtaining a channel length less than one micron is shown in sectional view in FIG. 2. The essential parts of this transistor are a gate electrode 1, a source 2, a semiconductor region 3 of low impurity concentration to constitute a part of a drain region, a semiconductor region 4 of high impurity concentration to constitute another part of a drain region, a semiconductor region 5 (base layer) in which a channel is formed, and an insulating film 6 between the gate electrode 1 and remainder of the element.

When, in this transistor, source 2 is an $n^+$ type semiconductor, region 3 is an n type semiconductor, and region 4 is an $n^+$ type semiconductor, region 5 becomes a semiconductor of p type. While thermal diffusion of a p type impurity forming the base region and an n type impurity forming the source region is carried out in the fabrication of this transistor in this case, the channel length is determined in part 5*a* by the difference between the diffusion lengths of the two impurities.

In this case, since the diffusion lengths in the lateral and depth directions are almost the same, the thickness of part 5*b* will become thin if the channel length is made short, and the resistance of this part will become high. Accordingly, the values of the base resistances $r_{B1}$ and $r_{B2}$ will become high.

As mentioned hereinbefore, an object of the invention is to produce a FET, as illustrated by one example in FIG. 2, of the type in which the length of the region in which a channel is formed is determined by impurity diffusion lengths, and in which the base resistances $r_{B1}$ and $r_{B2}$ become small even when the channel length is made short. In order to make the base resistances small and, moreover, to make the channel length short in a FET of the above stated type as illustrated by one example in FIG. 2, it is necessary to use a production process whereby the distance in the depth direction of the base layer is determined independently of the distance in the lateral direction.

In order to fulfill this requirement, it is contemplated in the present invention to provide a process wherein the atoms of the impurity for forming the base layer are introduced beforehand selectively and deeply into a semiconductor through a mask. In this case, the ion implantation technique is particularly used.

In one example of a MOS·FET having an n channel as illustrated in FIG. 3, a semiconductor assembly is first prepared comprising, as shown in FIG. 3(*a*), an $n^+$ type semiconductor region 11, an n type semiconductor region 12 superposed on region 11, an insulating film 13 disposed on region 12, a p type semiconductor region 15 which is a base region to be in which a channel is formed, and a mask 14, made of, for example, a thin metal film, for preventing implantation of ions into parts other than the part to become region 15.

Next, region 15 is widened by thermal diffusion in the lateral direction as indicated in FIG. 3(*b*), and then, by introducing an n type impurity by ion implantation or by thermal diffusion, a source region 16 is formed, as indicated in FIG. 3(*c*). In addition, a process step for adjusting the length of channel part 15*a* by thermal diffusion is carried out when necessary. Thereafter, steps of forming a gate oxide film and a gate electrode are carried out, whereupon a MOS·FET is obtained.

The channel part is formed by the difference between the diffusion lengths of the impurities of the region 15 and the region 16, and the channel length can be controlled as desired by the thermal diffusion step.

Figure 4A:
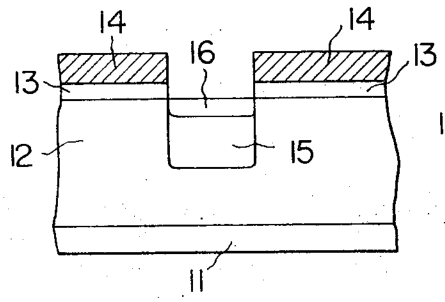
FIG. 4 (*a*) and 4(*b*) ar similar sections indicating another example of practice of the invention.
Figure 4B:
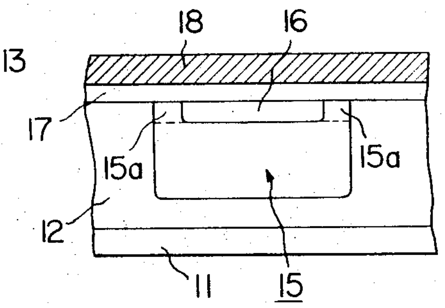

A process requiring the fewest steps comprises the following: Impurities for forming region 16 to become the source are introduced beforehand by ion implantation into the semiconductor structure through the same introduction hole formed in the thin metal film 14 for masking and the oxide film 13, as indicated in FIG. 4(*a*). Next, in the thermal step of forming a gate oxide film 17, an impurity of greater diffusion constant than the impurity for forming the source is selected and introduced beforehand into region 15 to become the base, whereby the channel part 15*a* is automatically formed by the difference between the diffusion lengths. The channel length can be controlled at will by appropriately selecting the temperature and time of the step for forming the gate oxide film 17. A gate electrode 18 is then formed, whereupon a completed MOS·FET as indicated in FIG. 4(*b*) is obtained.

Figure 5:
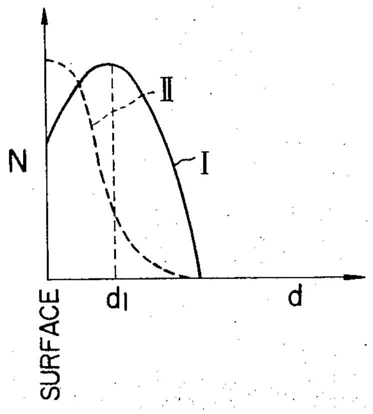
FIG. 5 is a graphical representation of distributions of concentration of impurity atoms indicating a desirable effect of the invention.

The impurity distributions in the direction of the depth, from the outer surface in the case where region 15 is formed by impurity diffusion and in the case where it is formed by ion implantation, are indicated comparatively in FIG. 5, in which the ordinate represents the impurity concentration N, and the abscissa represents depth *d* from the outer surface of the semiconductor. Curve I indicates this distribution in the case of ion implantation, while curve II indicates that in the case of impurity diffusion.

As is apparent from these distribtuion curves, an extremely high value or peak value of impurity concentration is produced at a certain depth $d_1$ in case of ion implantation, differing from a case of impurity diffusion. Since this depth $d_1$ can be controlled by the energy of the ions, it is possible, by forming region 15 with ample thickness and a region 16 of thin configuration, to form part 15*b* with great thickness irrespective of the channel thickness and, moreover, to obtain a high concentration. As a result, it is possible to obtain low values of resistance *r*B1 and *r*B2.

Furthermore, the concentration in part 15*a* in which the channel is formed does not become remarkably high, as in the case of thermal diffusion, even when the concentration of part 15*b* is increased. On the contrary, it is even possible to cause this concentration in part 15*a* to be lower than that of part 15*b*. Accordingly, there is no possibility of a remarkable reduction in the mobility $\mu$ of the carrier, and an ordinary value, that is, of the order of 200 cm.²/v.s. can be obtained.

In addition, by forming part 15*b* with a large thickness, it is possible to reduce the probability of punch through due to irregularity of crystals at the time of formation of region 16. Accordingly, the yield of the product can be increased.

Thus, by applying the process of the present invention to metal-insulated semiconductor type, field-effect transistors (MIS·FET), in each of which the length of the region in which a channel is formed is determined by impurity diffusion as described above, it is possible to produce these transistors for super-high frequencies having low base resistances and low base-to-drain capacitances in high yields with a small number of process steps.

The present invention, in another aspect thereof, contemplates the production of improved lateral transistors. As indicated by one example in FIG. 6, a known lateral transistor comprises an emitter region 21, a collector region 22, a base region 23, and an operation region (main base region) 3–1. The width W*b* (called the base width of operation region 3–1) is determined by the distance between the emitter and collector regions 21 and 22. These regions 21 and 22 are formed by impurity diffusion. Accordingly, the base width W*b* depends on the photoetching accuracy, and its minimum value is limited, this limit being considered at present to be 1 micron.

In actual practice, however, the characteristics of a transistor are determined principally by this base width W*b*, and a width W*b* of 1 micron corresponds to a frequency $f_t$ of the order of 100 MHz.

Therefore, a lateral transistor of the prior art with such a limitation cannot be used for super-high frequencies.

Figure 6:
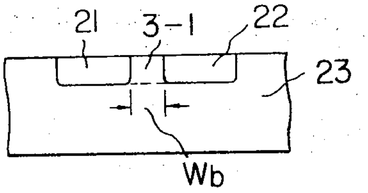
FIG. 6 PRIOR ART
FIG. 6 is an enlarged, fragmentary section showing a lateral transistor of known type.
Figure 7A:
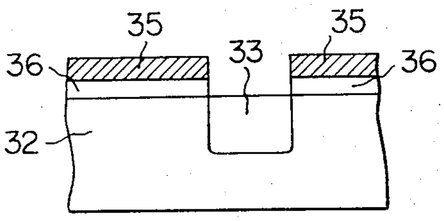
FIGS. 7(*a*) through 7(*e*) are similar sections respectively indicating successive steps in one example of practice of the process according to the invention for producing lateral transistors.
Figure 7B:
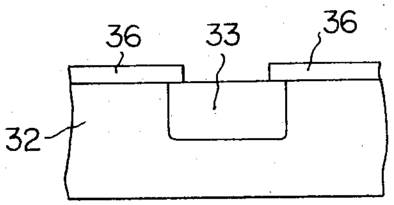
Figure 7C:
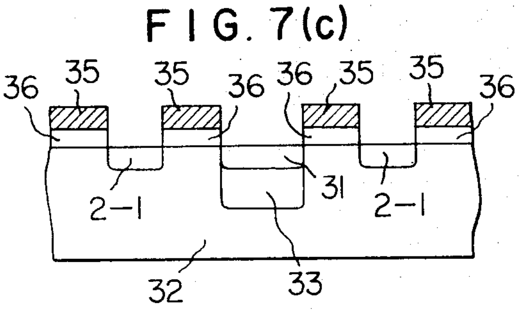
Figure 7D:
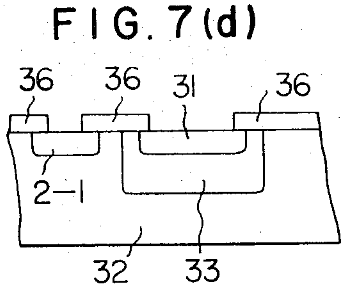
Figure 7E:
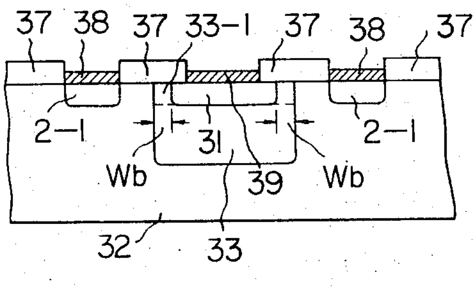
Figure 8A:
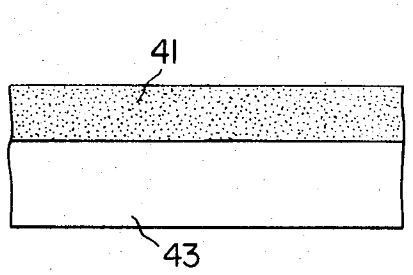
FIGS. 8(*a*) through 8(*e*) are similar sections respectively indicating successive steps in another example of the invention for producing lateral transistors.
Figure 8B:
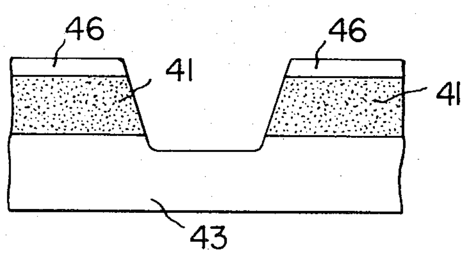
Figure 8C:
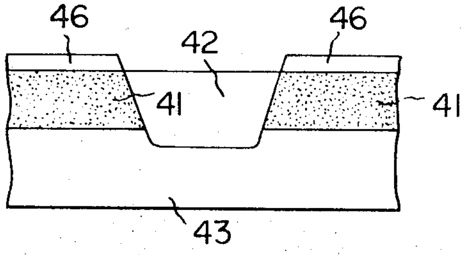
Figure 8D:
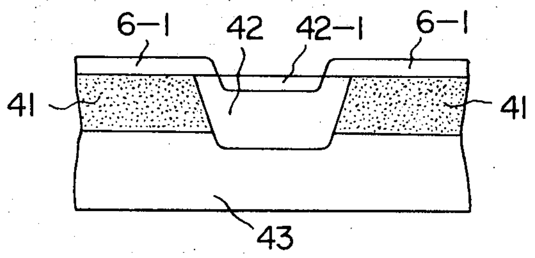
Figure 8E:
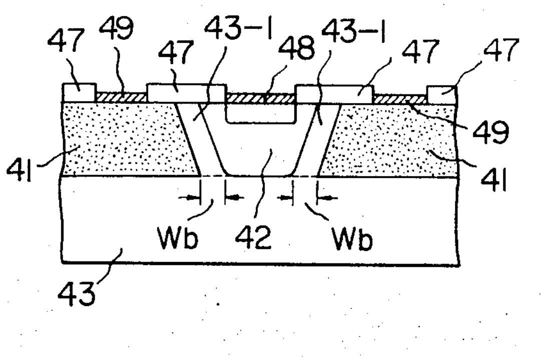

Furthermore, even if it were possible to make the base width W*b* as indicated in FIG. 6 less than 1 micron, the high-frequency characteristics of the transistor would be limited also by modulation ("Early effect") of the base width W*b* due principally to the extension of the depletion layer from the side of the collector region into the main base region 3–1 since the impurity concentration of this main base region 3–1 is lower than those of the emitter region 21 and the collector region 22. Consequently, there arises the risk of a "punch through" (i.e., a connecting of the emitter and collector regions 21 and 22 due to the depletion layer) whereby the device becomes incapable of operating normally.

As mentioned briefly hereinbefore, an object of the invention is to reduce appreciably the difficulties accompanying known lateral transistors and to provide a process for producing lateral transistors having super-high frequency characteristics. We have found that this object can be achieved by forming a base of a lateral transistor with a width less than 1 micron.

The invention also contemplates the provision of a process for producing lateral transistors wherein control of the base width is made possible irrespective of the photoetching accuracy. This has been achieved through utilization of the difference between lengths of impurity diffusion.

The invention further contemplates the provision of lateral transistor with a region of low impurity concentration on the collector side thereby to prevent deterioration of D-C electrical characteristics of the transistor and to minimize the collector-to-base capacitance and the base resistance even when the base width is made less than 1 micron.

In one embodiment of the invention as illustrated in FIG. 7, an npn transistor is produced. First, a double layer of an insulating film and a thin metal film (only a thin metal film or an insulating film being used in some cases) formed on an n type semiconductor substrate 32 is partially removed by a procedure such as photoengraving, and a window for introduction of an impurity is opened. Then, by ion implanation, a p type impurity as for example, boron, is introduced to form a base region 33 as indicated in FIG. 7(*a*) in such manner that the maximum impurity concentration is located at a given distance $d_1$ from the surface of the substrate 32 as shown by curve I in FIG. 5, and the total depth of the region 33 is much greater than the subsequent lateral expansion of the region due to the succeeding diffusion step. The other parts of the device are now the substrate constituting a collector region 32, the base region 33, the above mentioned thin metal film 35, an dthe insulating layer 36. Next, in order to form a good ohmic contact with the collector, a window is opened for forming a region 2–1 having an impurity concentration higher than that of the region 32, and an $n^+$ type emitter region 31 are formed by ion implantation or by impurity diffusion to introduce an impurity such as arsenic, for example in such amanner that the total depth of regions 31 is less than $d_1$ as indicated in FIG. 7(*c*) for the case of ion implantation, and as indicated in FIG. 7(*d*) for the case of diffusion. In the case of introduction of the second impurity by diffusion the first region is first laterally diffused by a heat treatment step as shown in FIG. 7(*b*).

Then, by thermal diffusion, a main base region 33–1 is formed, although this region is already formed in the case of impurity introduction by diffusion, since the diffusion speed of boron is higher than that of arsenic so that boron diffuses first into the n type semiconductor region 32, whereby, the p type region is expanded, and region 33–1 is formed.

At this time the base with W*b* can be controlled at will to a fineness of less than 0.1 micron by selecting the temperature and time. Thereafter, electrodes are formed as indicated in FIG. 7(*e*), in which there are shown an insulating film 37, collector electrode 38, and emitter electrode 39. By the practice of this example, the depletion layer extends principally toward the collector region since the impurity concentration of the base region becomes higher than that of the collector region. As a result, the aforementioned "Early effect" is lessened, the collector-to-base capacitance is minimized, and it becomes difficult for "punch through" to occur.

The base width W*b* can be made less than $0.5\mu$, and, moreover, the main base region can made shallow, while the depth and impurity concentration of the base region other than the main base region can be increased by the energy (acceleration voltage) of the implanted ions. Accordingly, the base resistance can be easily reduced, whereby it is readily possible to produce a lateral transistor suitable for operation at a frequency $f_t$ above 1 gHz.

In another embodiment of the invention as illustrated in FIG. 8, the process of the invention is applied to an npn transistor similarly as in the proceding example.

First, an n type semiconductor region 41 is formed in a p type semiconductor substrate 43 as indicated in FIG. 8(*a*). The n type impurity used in this step is one having a diffusion speed lower than that of the p type impurity in the substrate 43. Next, by photoengraving, a part of region 41 is selectively etched until the substrate 43 is exposed as incated in FIG. 8(*b*). Then, by selective epitaxial growth, an $n^-$ type semiconductor region 42 is formed as indicated in FIG. 8(*c*). During this step, the impurity concentration of region 42 is made less than that of region 41. Next, by selective diffusion, an $n^+$ type semiconductor region 42–1 is formed as indicated in FIG. 8(*d*).

Alternatively, by liquid or gas phase deposition, such as by increasing the impurity gas concentration at an intermediate point in the step of forming the $n^-$ type semiconductor region 42, it is also possible to form continuously an $n^+$ type semiconductor region and, at the same time or in the succeeding step by the thermal diffusion of the impurity which is intentionally doped in the emitter region 41 and is opposite conduction type of the emitter region, to form a main base region 43–1 as indicated in FIG. 8(*e*). Finally, a collector electrode 48 and an emitter electrode 49 are formed. The lateral transistor thus produced has an emitter region 41, a collector region 42, a base region 43, and an insulating film 47. Reference numbers 6–1 and 46 in FIGS. 8(*d*) and 8(*c*) designate masks for selective diffusion and forming of the $n^-$ type region by selective epitaxial growth.

It will be apparent that, in the above example, the provision of a gate electrode above the main base region 43–1 over the insulating film and an organization for controlling the surface potential is within the purview of the present invention.

Thus, as is apparent from the foregoing description, the present invention provides a process affording several advantages, which could not be attained by known processes for producing lateral transistors, such as the reduction of the so-called "early effect," prevention of the accompanying "punch through," and effectiveness with respect to high-frequency characteristics, that is, reduction of base width and base resistance.

What is claimed is:

1. A method of producing a semiconductor structure comprising the steps of:

providing a semiconductor substrate with a mask coating for preventing ion implantation and diffusion having an opening therethrough communicating with a surface of the substrate;

introducing a first impurity into said substrate by ion implantation through said opening to provide a first semiconductor region within said substrate, and controlling the ion beam energy of said ion implantation such that the maximum concentration of said first impurity is disposed at a predetermined intermediate depth spaced between said surface of the substrate and the maximum depth of said ion implanted first impurity;

introducing a second impurity into said first semiconductor region through said opening, wherein said second impurity is of opposite conductivity type and has a lesser diffusion coefficient as compared to said first impurity, thereby providing a second semiconductor region in said first region, and controlling said introduction of said second impurity, into said first semiconductor region such that the depth of said second impurity as measured from said substrate surface is less than the said maximum depth of said first impurity; and heating said semiconductor substrate including said first and second semiconductor regions to a temperature for a time sufficient to diffuse said first impurity laterally within said substrate to extend said first region laterally beyond the periphery of said opening, while controlling said lateral diffusion by controlling the temperature and duration of said heating step so that said lateral diffusion is substantially less than said maximum depth of said first impurity and said second semiconductor region is wholly within the volume of said first semiconductor region and the maximum impurity concentration of said first region lies at a depth directly below said second region.

2. A method of producing a semiconductive structure as set forth in claim 1, wherein said step of introducing said second impurity is performed by ion implantation while controlling the ion beam current and implantation time of said ion implantation of said second impurity so that the maximum depth of said second region is less than the maximum depth of said first region, and so that the surface concentration of said second impurity is greater than that of said first impurity.

3. A method of producing a semiconductive structure as set forth in claim 1, wherein said step of introducing said second impurity is performed by selective impurity diffusion.

4. A method of producing a semiconductive structure as set forth in claim 1, wherein said step of introducing said second impurity is performed by selective impurity diffusion subsequent to said heating step.

References Cited

UNITED STATES PATENTS

| | | | |
|---|---|---|---|
| 3,655,457 | 4/1972 | Duffy et al. | 148—1.5 |
| 3,246,214 | 4/1966 | Hugle | 317—235 |
| 3,260,624 | 7/1966 | Wiesner | 148—175 |
| 3,290,189 | 12/1966 | Migitaka et al. | 148—188 |
| 3,293,084 | 12/1966 | McCaldin | 148—1.5 |
| 3,388,009 | 6/1968 | King | 148—1.5 |
| 3,390,019 | 6/1968 | Manchester | 148—1.5 |
| 3,412,297 | 11/1968 | Amlinger | 317—235 |
| 3,456,168 | 7/1969 | Tatom | 317—235 |
| 3,523,042 | 8/1970 | Bower et al. | 148—1.5 |
| 3,515,956 | 6/1970 | Martin et al. | 317—234 |

FOREIGN PATENTS

| | | | |
|---|---|---|---|
| 1,045,429 | 10/1966 | Great Britain | 317—235 |

OTHER REFERENCES

Lin et al.: "Lateral Complementary Transistor . . . Functional Blocks," Proc. IEEE, December 1964, pp. 1491–1495.

L. DEWAYNE RUTLEDGE, Primary Examiner

W. G. SABA, Assistant Examiner

U.S. Cl. X.R.

29—571, 574, 578; 148—175, 187, 189, 190; 317—235 R